Sept. 15, 1925.  1,554,133

W. SCHMID

FISHING REEL

Filed July 5, 1924

Inventor:
William Schmid
By
Attorneys

Patented Sept. 15, 1925.

1,554,133

UNITED STATES PATENT OFFICE.

WILLIAM SCHMID, OF COLDWATER, MICHIGAN.

FISHING REEL.

Application filed July 5, 1924. Serial No. 724,307.

*To all whom it may concern:*

Be it known that I, WILLIAM SCHMID, a citizen of the United States, residing at Coldwater, in the county of Branch and State of Michigan, have invented certain new and useful Improvements in Fishing Reels, of which the following is a specification, reference being had therein to the accompanying drawings.

This invention has reference to fishing reels of the type known as anti-back lash reels wherein a drag mechanism is provided for the purpose of controlling the action of the reel in making a cast in order that the unwinding of the reel will be checked on the completion of the cast to prevent undesired release of superfluous line with the consequent danger of the line becoming snarled or entangled.

In such reels, this is usually effected by the use of a hinged bail through or under which the line passes and which is operated by the line when in tension during the making of a cast or when being otherwise drawn out from the reel, the said bail actuating a brake member which in turn engages or is disengaged from the spool for the required purpose. The mounting of this brake and its cooperating parts has in these instances required the use of special supporting means auxiliary to the end rings of the reel frame, or have been carried by the head cap, the said arrangements being more or less complicated and requiring a partial disassembling of the brake mechanism in order to effect the removal of the head cap in closing the end of the spool and have, moreover, by reason of their design, been limited to some extent as to frictional area presented to the spool.

These disadvantages I overcome by my invention, which also provides for the mounting of the drag mechanism upon the head ring of a reel without necessitating the mechanical association of the head cap therewith and thereby permitting the removal of the said head cap without interfering with the said drag mechanism.

It is also an object of this invention to provide a brake member pivoted to an outer head ring and extending inwardly of said head ring with the brake proper of the said member at the inner end thereof and bent or projecting beneath the rim of the spool, the said brake member being operable by a bail also mounted in said head ring.

Still further objects subsidiary to and resulting from the aforesaid objects, or from the construction or operation of the invention as it may be carried into effect, will become apparent as the said invention is hereinafter further disclosed.

In carrying the said invention into effect I may provide in an anti back lash reel a head ring having an opening coincident with the end of the spool, which spool is provided with a rim contiguous to the margin of the said opening, a bail in the form of a cranked lever journaled in the said head ring, the extremity of which bail is adapted to actuate a brake member also swingably mounted on the said head ring and operable against the action of the spring carried thereby, and said brake member being provided at its free end with an inwardly turned brake proper which internally engages the rim of the said spool. All of which is more particularly described and ascertained hereinafter, by way of example, having reference to the accompanying drawing, wherein Figure 1 is an elevation of a fishing reel with the head cap removed, illustrating the improved brake mechanism;

Similar characters of reference indicate similar parts in the several figures of the drawing.

Figure 1:
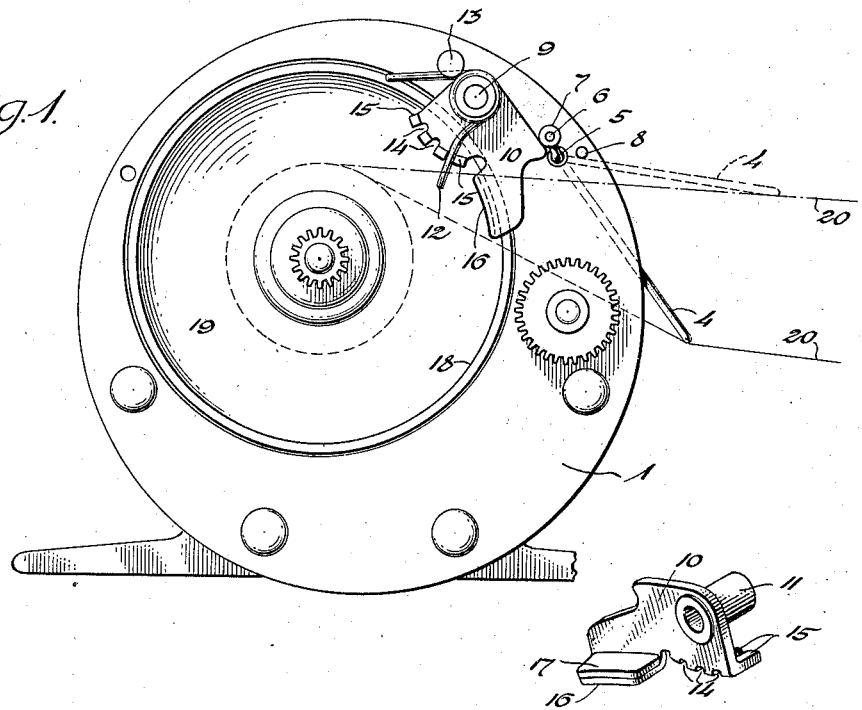
Figure 3:
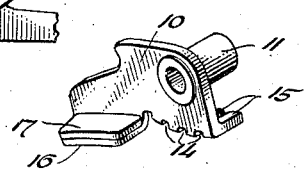
Figure 3 is a perspective detail back view of the brake member removed.

Only one end of the spool is shown as being necessary to a proper indication of the said invention, 1 being the head ring at this end of the reel to which is fitted the head cap 2 by means of screws 3, and 4 is a bail journaled in the said ring 5 and having a cranked end 6 upon which is mounted a roller 7. The upward movement of the bail 4 is limited by a stop 8 on the back of the head ring.

On the face of the said head ring is a protecting pin 9 upon which is mounted a brake member 10 having a boss 11 around which is wound a coiled spring 12 one end of which impinges against the stop 13 on the head ring, the other end being engaged in one or other of recesses 14 between teeth 15 on the said brake member. The toothed arrangement permits the adjustment of the tension 9 of the spring 12. This brake member is also provided at its outer free end with an inwardly turned ear piece 16 preferably faced with leather or similar material 17 adapted to engage the internal face of a rim 18 on the spool end 19 under the influence of the said spring 12.

Figure 2:
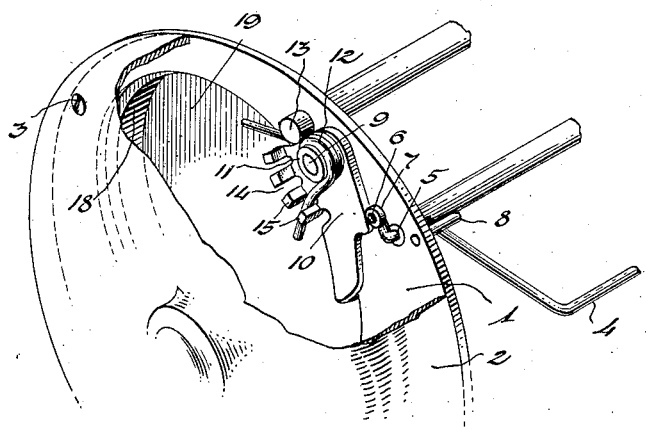
Figure 2 is a broken perspective view of the same together with the head cap.

The brake, when in operation, resists the rotation of the spool as will be readily understood, such operative position being indicated in Figure 1 and the bail being shown in full lines, but when the line 20 is taut, as shown in chain lines in said Figure 1 and the bail raised as shown in dotted lines therein, the brake member is depressed by the cranked end of the said bail releasing the brake and permits the free rotation of the spool as required. Figure 2 illustrates the parts in the position occupied when the bail is raised.

It will be seen that the head ring supports all of the operative parts of the brake mechanism, so that the head ring may be removed without interference therewith, and that the construction does not call for the use of any additional supporting member for such parts or for any of them.

Figure 4:
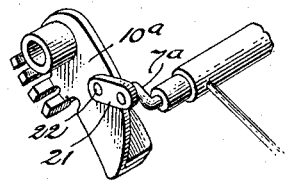
Figure 4 is a perspective detail view illustrating the modified arrangement of connection between the bail member and the brake member.

In the example shown in Figure 4 the brake member 10ª is shown as being attached to the cranked end 7ª of the bail by a link 21 which is pivoted to the said brake member at 22, this effecting a positive association of the bail member with the brake member.

A device of the type described may be very easily constructed and assembled and lends itself readily to inspection and cleaning from time to time without danger of disturbing its adjustment or complicating the procedure necessary for effecting the detaching and attaching of the head cap.

This invention may be developed within the scope of the appended claims without departing from the essential features of the invention, and it is desired that the specification and drawing be read as being merely illustrative and not in a limiting sense, except as necessitated by the prior art.

What I claim is:—

1. In a fishing reel wherein a brake is normally applied to a spool, and wherein a line shifted bail is alapted to release the brake; means for maintaining the brake normally applied, said means including a spring supported by the brake, and a series of teeth on the brake and between two of which teeth an end of said spring is held and adapted for engagement with other teeth to increase the braking action of said brake.

2. A fish reel brake as called for in claim 1 wherein said brake is in the form of a member having the teeth on one side thereof and a spool engaging shoe on its opposite side.

3. In a device of the class described, a spool, a head ring around one end thereof, a brake on said head ring, said brake having a series of recesses, a spring on said head ring moving said brake into engagement with said spool, said spring having an end thereof in one of the brake recesses and adapted to be shifted to other recesses to increase the tension of said spring, and a bail also mounted on said head ring and actuating said brake in opposition to said spring.

4. In a device of the class described, a spool, a head ring, a brake member on said head ring, normally engaging said spool, and a bail having a cranked end linked to said brake member whereby said bail operates said member for the purposes specified.

In testimony whereof I affix my signature.

WILLIAM SCHMID.